United States Patent [19]
Hernandez

[11] Patent Number: 5,259,599
[45] Date of Patent: Nov. 9, 1993

[54] COIL SPRING, IN PARTICULAR FOR A TORSION DAMPER

[75] Inventor: Georges Hernandez, Paris, France

[73] Assignee: Valeo, Paris Cedex, France

[21] Appl. No.: 900,268

[22] Filed: Jun. 18, 1992

[30] Foreign Application Priority Data

Jun. 20, 1991 [FR] France .................. 91 07565

[51] Int. Cl.⁵ .............................................. F16F 1/06
[52] U.S. Cl. ........................................ 267/180; 267/166
[58] Field of Search ............... 267/166, 180, 179, 170, 267/182, 154, 155, 273, 275, 286, 288

[56] References Cited

U.S. PATENT DOCUMENTS

| | | |
|---|---|---|
| 3,974,903 | 8/1976 | de Gennes . |
| 4,735,403 | 4/1988 | Matsumoto et al. . |
| 4,810,231 | 3/1989 | Weissenberger et al. ...... 267/180 X |
| 4,923,183 | 5/1990 | Saka .................... 267/180 |
| 4,957,278 | 9/1990 | Komura et al. ............ 267/180 X |

FOREIGN PATENT DOCUMENTS

| | | |
|---|---|---|
| 143515 | 6/1985 | European Pat. Off. . |
| 1460793 | 10/1965 | France . |
| 2609125 | 7/1988 | France . |
| 60-241535 | 5/1984 | Japan . |
| 59-190528 | 10/1984 | Japan . |
| 60-69337 | 4/1985 | Japan . |
| 60-241542 | 11/1985 | Japan . |
| 0251537 | 11/1987 | Japan .................. 267/180 |

OTHER PUBLICATIONS

"Ventilfedern mit Drahtquerschnitten, die von der Kreisform abweichen", Niepage et al., Draht, vol. 32, No. 7/8, Aug. 1991, pp. 495-503.

*Primary Examiner*—Douglas C. Butler
*Attorney, Agent, or Firm*—Longacre & White

[57] ABSTRACT

A coil spring for a torsion damper in a motor vehicle has a non-circular cross section. The cross section of the wire of the coil spring is generally ovoid in shape, with its narrow end defined by a point directed outwardly of the spring, and two lateral convexities, the profile of the cross section consisting of two symmetrical multi-arc curves in the form of splines (in the mathematical sense) joined to each other.

4 Claims, 3 Drawing Sheets

COIL SPRING, IN PARTICULAR FOR A TORSION DAMPER

FIELD OF THE INVENTION

This invention relates to coil springs, in particular, though not exclusively, for torsion dampers which may for example be utilized in motor vehicle clutches.

BACKGROUND OF THE INVENTION

It is known to provide a coil spring, also known as a helical spring, which is characterized in particular by the cross section of its wire, the coil radius of the latter and the pitch of the helix. The cross section of the wire is conventionally circular.

In the specification of U.S. Pat. No. 4,735,403, it has been proposed to provide a wire having an elongated cross section with a surface which is generally semi-circular in the outer part of the helical spring and generally semi-elliptical in the inner part of the spring, with an arc of a circle tangential between the semi-ellipse and the semi-circle.

Such cross sections as are mentioned above are not optimal as regards the reduction in their height or depth, and in practice involve maximum stresses which are slightly greater than those which occur in a spring of wire having a circular cross section. The maximum stress, as mentioned in the above mentioned United States patent specification, is at 55 degrees.

DISCUSSION OF THE INVENTION

An object of the present invention is to overcome this drawback and thus to reduce the depth of the cross section (or free length), while at the same time having, for a given free length and a given external diameter of the spring, a maximum stress that is as close as possible to that of a spring of wire having circular cross section.

According to the invention, there is provided a coil spring, in particular but not exclusively for a torsion damper for a motor vehicle, characterized in that the cross section of the wire of the spring has a generally ovoid shape with a pointed end defining a point directed outwardly of the spring and two convexities, and in that the cross section is limited by two symmetrical multi-arc curves in the form of splines joined to each other.

In this Application, except where indicated otherwise, the word "spline" is used in the mathematical sense of a multi-arc curve comprising a succession of polynomial arcs (not necessarily arcs of circles), the spline being continuous as to both tangency and curvature so that the shape of the curve defined by the individual arcs is smoothed out.

The outwardly directed point is defined by the splines to have a low radius of curvature such that the point is generally flattened.

This arrangement further reduces the depth of the wire. Due to the convexities (which are also referred to as "rumps" in this Application), the maximum stresses are spread over the internal portion of the periphery, that is to say between the two convexities. This limits the maximum stress to a value which is practically identical to that in a spring of wire having a circular cross section. All excess or non-useful material is thus eliminated, the variations in curvature of the cross section being attenuated.

It will be appreciated that, especially in the context of a torsion damper having two coaxial parts arranged to be displaced circumferentially with respect to each other, this angular displacement can be increased if the damping springs coupling the two coaxial parts together are of the kind according to the invention. This increased relative displacement between the two coaxial parts enables vibrations to be damped more effectively, and also reduces noise. When the spring is used as a valve spring, the number of turns can be reduced, thus giving an improvement in weight and reducing energy consumption.

It will also be appreciated that the overall length of the spring is reduced as compared with a spring of wire having a circular cross section.

The invention is illustrated in the description of preferred embodiments of the invention that follows, in which it is described in the context of a clutch friction wheel for a motor vehicle, given by way of example only and with reference to the accompanying drawings.

DESCRIPTION OF PREFERRED EMBODIMENTS OF THE INVENTION

Figure 1:
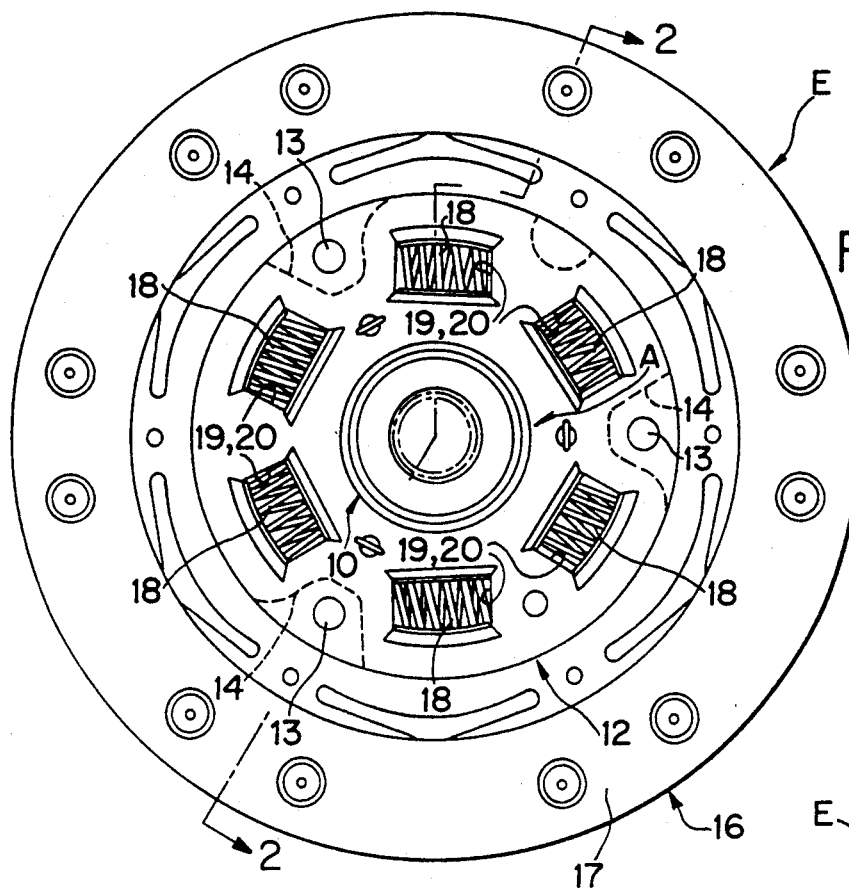
FIG. 1 is a view in elevation of part of a torsion damping device, seen in the direction of the arrow 1 in FIG. 2.
Figure 2:
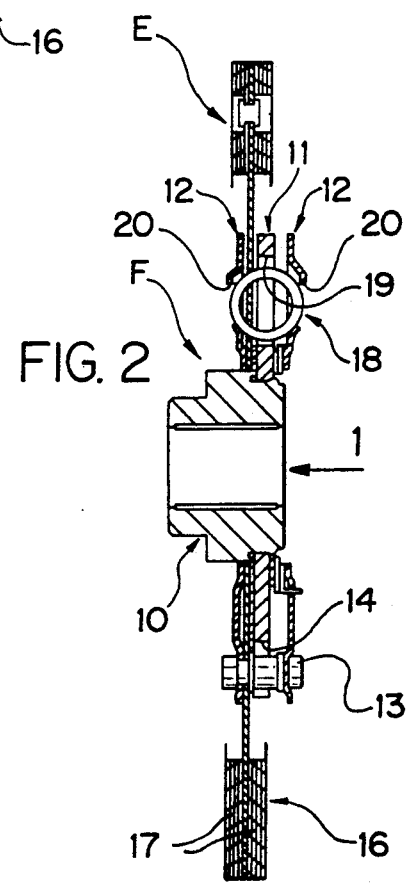
FIG. 2 is a view in axial cross section taken on the line 2—2 in FIG. 1.
Figure 3:
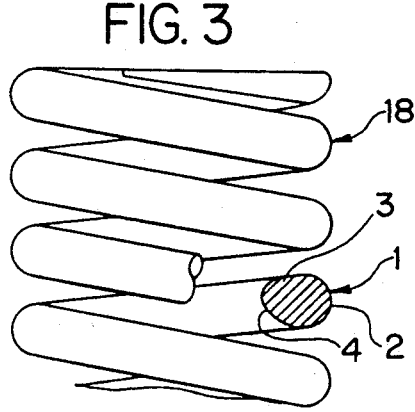
FIG. 3 is a view in elevation showing part of the helical spring in accordance with the invention, shown partly cut away.

FIGS. 1 and 2 show a torsion damper in the form of a friction wheel for a clutch for a motor vehicle having an internal combustion engine. The torsion damper consists in general terms of two coaxial parts which are mounted for rotation with respect to each other within the limits of a predetermined angular displacement and against the action of circumferentially acting helical spings.

In the usual way, a first part E of the damper comprises a hub 10 which is splined internally (i.e. splined in the sense of having axial teeth mating with axial grooves), for securing it in rotation, in this example, to the input shaft of the gearbox of the vehicle. The hub 10 carries a hub plate or damper plate 11 on its outside, which projects radially outwardly and which is secured to the hub in rotation, optionally after a clearance has been taken up. In this example, the hub plate 11 is carried on the hub by inter-engagement, but in a modification it may be integral with the hub 10.

The second part F of the damper comprises two guide rings 12 which extend transversely with respect to the axis of the hub 10, on either side of the hub plate 11 and spaced away from the latter. The guide rings 12 are joined to each other in several places by means of axial spacers 13 which pass, with a clearance, through passages 14 formed for this purpose in the outer periphery of the plate 11. The coaxial part F also includes a friction disc 16 which is fixed, by means of the spacers 13, with respect to the guide rings 12 and in contact with one of the latter. The disc 11 carries friction liners or pads 17 at its periphery, on either side of the disc. The liners 17 are, in known manner, arranged to be gripped between the pressure plate and reaction plate (not shown) of the clutch, these plates being fixed in this example with respect to the crankshaft of the internal combustion engine of the vehicle.

A number of helical springs 18 are interposed circumferentially between the two coaxial parts E and F of the damper. In this example there are six of these springs. Also interposed between the two parts E and F are friction means comprising friction rings, which are under resilient compression and interposed axially between the damper plate 11 and the guide rings 12, in the manner described for example in the specification of U.S. Pat. No. 3,974,903. These springs 18 ar equal intervals on a common pitch circle, in which they are all tangent to a common circumference of the assembly. Each spring is individually arranged partly in a housing defined in the rotatable part E and partly in a housing formed in the rotatable part F. In the present example, the springs 18 are of resilient metallic wire and are received in windows 19 formed in the damper plate 11 and in windows 20 formed in the guide rings 12. The windows 19 are aligned with the windows 20.

Figure 4:
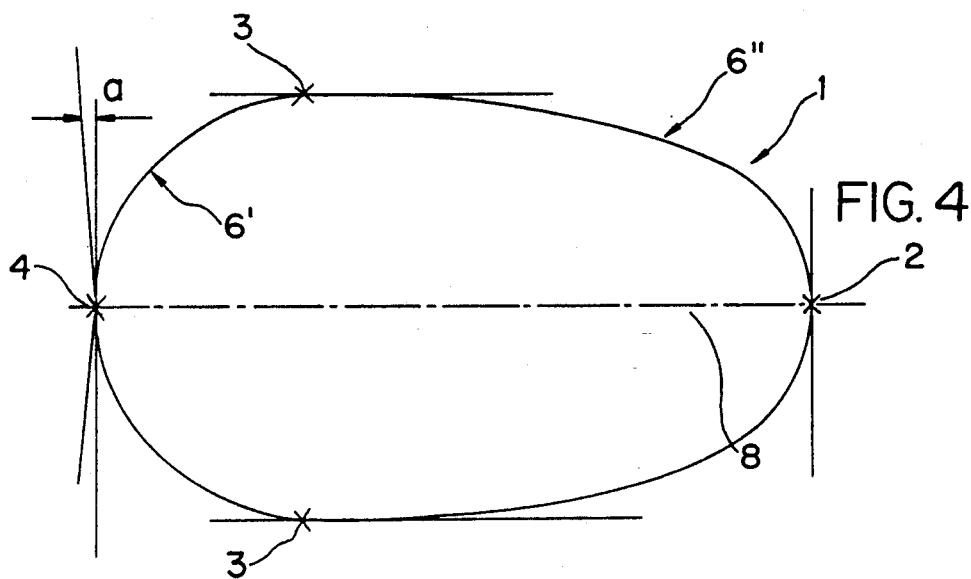
FIG. 4 shows the cross section of the wire of the spring according to the invention, with its tangents.

Each of the helical springs 18 is characterized in that the cross section 1 of its wire is generally of ovoid shape, having a wider end on the left in FIG. 4, and a narrower end on the right. The narrower end defines a point 2 directed outwardly of the spring. The cross section has two convexities or rumps 3. The cross section 1 is delimited by a profile comprising two symmetrical multi-arc curves joined to each other. Each of these multi-arc curves is in the form of a spline, as defined earlier in this description.

Figure 5:
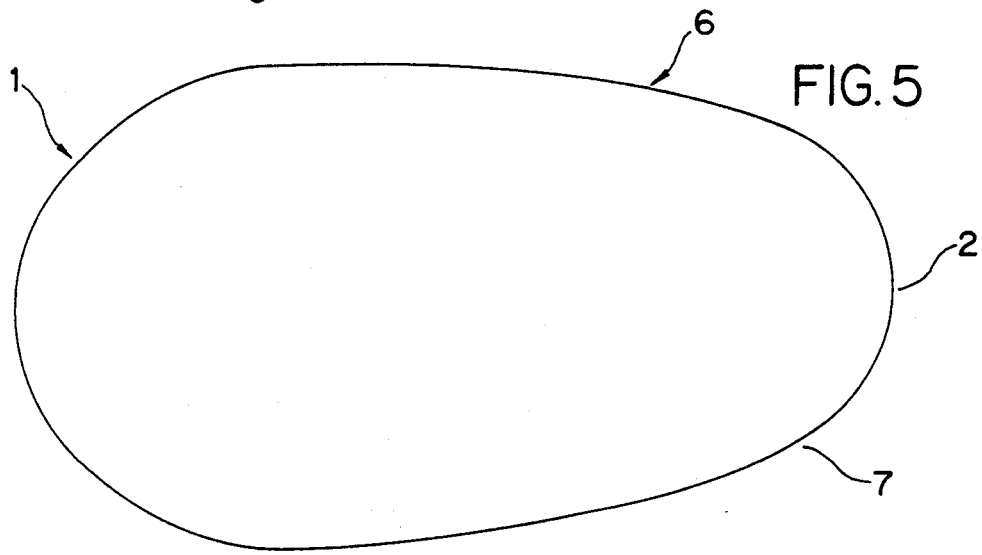
FIG. 5 is a view on a different scale but similar to FIG. 4, without the tangents.
Figure 7:
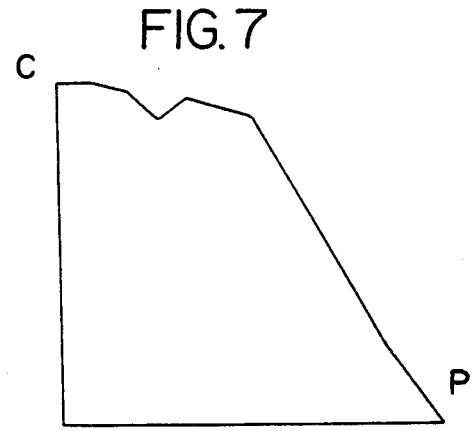
FIG. 7 is a diagram similar to FIG. 6 for the particular embodiment according to the invention that is described.

In this example (FIG. 5) the egg-shaped cross section of the wire is symmetrically elongated towards the outside of the spring (i.e. at right angles to the axis of symmetry of the latter). The cross section is defined by two splines 6 and 7 symmetrical to each other and joined to each other. Thus, by contrast with the arrangement disclosed in the specification of U.S. Pat. No. 4,735,403, the point 2 of the cross section is directed outwardly. In addition, by virtue of the rumps 3, it is possible to smooth out the stresses in the manner shown in FIG. 7, in which the point of origin or zero point corresponds to the point 4, or pole, shown in FIG. 4. In FIG. 7, stresses are given on the ordinate, while the abscissa gives position along the perimeter of the cross section of the wire. The point 4 is the pole of reference or inner extremity. Variations in the curvatures of the cross section are attenuated. The point 2 thus has a radius of curvature that is smaller than the remainder of the cross section, and is therefore generally flattened in shape.

Figure 6:
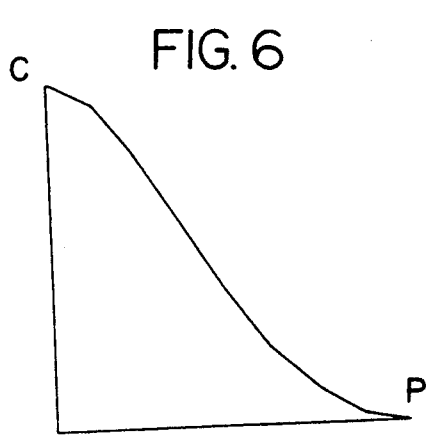
FIG. 6 shows the characteristic curve of a spring having a circular cross section, with stress shown on the ordinate and the position on the perimeter of the cross section shown on the abscissa.

Thus it will be appreciated, with reference to the curve shown in FIG. 6 which is the stress/position curve for a spring made of wire having a circular cross section, that the maximum stresses are distributed over the inner portion of the cross section, that is to say between the two rumps or convexities 3, passing through the point 4 and eliminating excess material.

It will also be appreciated that it is possible to reduce the depth of the wire. More precisely, tests have been carried out with a spring of wire having a circular cross section, with two springs having a wire with a cross section as disclosed in U.S. Pat. No. 4,735,403, and with a spring in accordance with the present invention. These tests gave the following table, in which the four columns A to D give the results obtained form the four different springs, as follows:

Column A: Spring with wire of circular cross section:
Column B: A first spring of wire having a cross section according to U.S. Pat. No. 4,735,403;
Column C: A spring similar to that in Column B but of a different size; and
Column D: A spring of wire having a cross section in accordance with the present invention.

In Columns B to D, under "wire size", a transverse dimension is given, followed by depth. All dimensions in this table are in millimetres, with forces being expressed in Newton.

| SPRING | A | B | C | D |
| --- | --- | --- | --- | --- |
| Wire Size | 4 | 4.34 × 3.17 | 1.53 × 3.52 | 5 × 2.92 |
| Internal Diameter | 15 | 14.32 | 13.94 | 13 |
| External Diameter | 23 | 23 | 23 | 23 |
| Total number of burns | 5.9 | 6.31 | 6.4 | 7.15 |
| Number of working turns | 3.9 | 4.31 | 4.4 | 5.15 |
| Relaxed height | 38.2 | 38.2 | 38.2 | 38.2 |
| Compressed height | 22.6 | 21.3 | 21.65 | 20.13 |
| Stiffness | 9.482 | 8.122 | 8.596 | 7.2 |
| Deflection under 855N Load | 9.2 | 10.73 | 10.14 | 12.60 |
| Increase in Displacement (%) | 0 | 16 | 10 | 31 |
| Max. Stress (N/mm$^2$) | 895 | 988 | 932 | 904 |

As will be evident from this table, the spring design in accordance with the present invention enables the two coaxial parts E and F to be displaced relatively to each other in rotation by an increased amount. The gain in angular displacement is 31% as compared with a helical spring of circular cross section having the same outer diameter and the same relaxed height (or free length). This gain in available displacement is greater than that obtained with the improvements previously proposed, while at the same time the maximum stresses are reduced as compared with the latter. It will be noted that the maximum stress figure given in the table is only very slightly greater than that for the spring of wire having a circular cross section. In addition, the total number of turns or coils of the spring, and the compressed height, i.e. the length of the spring at the end of the angular displacement between the two coaxial parts of the torsion damper, are also able to be increased.

Thus, without having to make any modifications to a conventional clutch friction wheel, and in particular without changing the size of its windows or spring housings, the springs described here and shown in the drawings can be fitted as change parts in place of the conventional springs of wire having a circular cross section, without significantly increasing the maximum stress and also with a reduction in the thickness of the wire (i.e. 2.92 mm as compared with 4 mm).

It will be noted that the wire in the springs of the invention is more elongated in the radial direction of the spring, its internal diameter being smaller than in either of the two prior art arrangements represented in the table. More precisely, the point 2 (FIGS. 4 and 5) consists of a generally flat surface portion extending approximately at right angles to the axis of symmetry 8 at the cross section. The rumps 3 are fairly close to the internal apex 4. This enables better damping of vibrations, and better reduction of the noises which occur in the transmission between engine crankshaft and the gearbox input shaft output, to be obtained.

The pitch of the spring can also be varied so as to improve progressivity, according to the application to which the spring is to be put.

As mentioned earlier in this document, the curve referred to as a spline is a multi-arc curve which enables the profile of a surface to be smoothed out. An "arc" in this context is a curve which is defined mathematically by a polynomial equation, the degree of which lies generally in the range 1 to 15. The spline comprises a succession of polynomial arcs joined together, so as to be continuous with each other both in tangency and in curvature. The third derivative is thus continuous. In this example the cross section is symmetrical about the axis of symmetry 8. Each spline 6 and 7 is defined by two cubic lines (i.e. arcs representing polynomials of the third degree). The first spline 6' joins together the points 4 and 3 (FIG. 4), while the second spline 6" joins together the points 3 and 2.

The vector which is tangent to the point 2 is vertical, i.e. perpendicular to the axis of symmetry 8, while the vector which is tangent to the point 4 makes a small angle with the perpendicular to the axis 8. This angle (a, FIG. 4) lies between 0 and 7 degrees, and is preferably 5 degrees, and permits accurate definition of the rumps 3 and consequent inward curving of the profile. The apices or pole points lying on the axis of symmetry at 4 and 2 are flattened. At the apices corresponding to the rumps 3, the tangential vectors are parallel to the axis of symmetry 8 as shown in FIG. 4.

It will be noted that the cross section of the wire is thus smoothed out, with attenuated variations in curvature, and that its outer end 2 (i.e. that end of the cross section that is more distant from the axis of symmetry of the spring itself) is constituted by two arcs, each of which is part of a respective one of the two splines 6 and 7, and which are nearly perpendicular to the axis of symmetry 8 of the cross section of the wire. The rumps 3 are closer to the pole 4 or internal end than is the point 2.

In this example the wire, which does of course consist of spring wire, is of metal.

The wire of which the spring is made may however be made of a composite material, consisting of a base of plastics material reinforced with suitable fibres.

Figure 8:
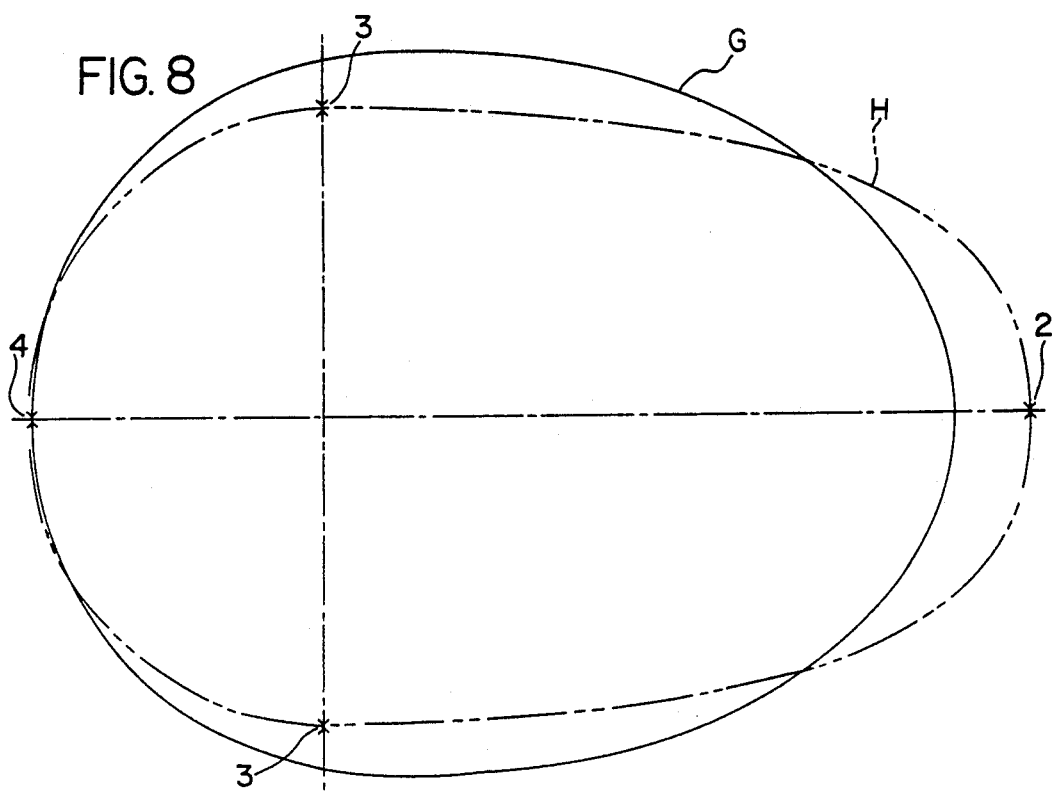
FIG. 8 shows, superimposed on each other, the cross sections of a wire in accordance with the invention and a wire with a cross section which is reversed with respect to that disclosed in the specification of U.S. Pat. No. 4 735 403, the point being directed outwardly.

From FIG. 8 it will be noted that even if the orientation of the cross section of the wire, of the kind disclosed in the specification of U.S. Pat. No. 4,735,403 and indicated at G (the narrower end then being directed towards the outside of the curve 6), is reversed, a wire height, i.e. a transverse dimension of the wire cross section extending in the axial direction of the spring, is obtained that is greater than with the wire in accordance with the invention, which is shown in phantom lines at H. On the other hand the curve H also shows an outward elongation of the wire cross section that enables the curve to be optimised.

Figure 9:
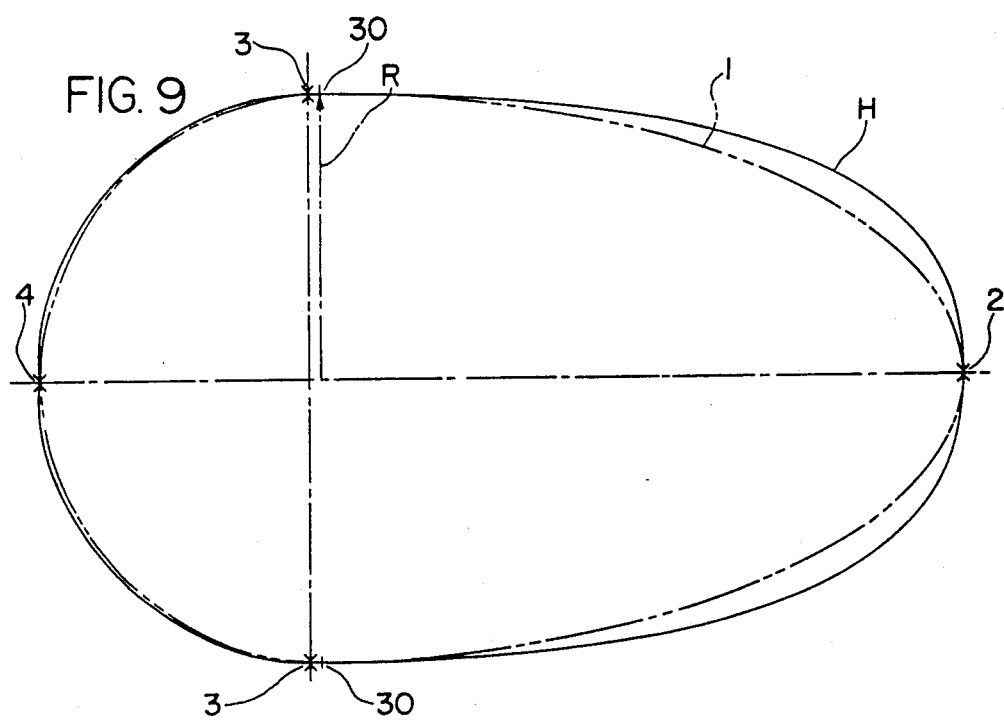
FIG. 9 is a view similar to FIG. 8, in which the other wire has a cross section defined by a semi-ellipse and a semi-circle, with an unconventional ratio.

FIG. 9 repeats the curve H, this time in full lines, and compares it with a curve I in phantom lines which represents the cross section profile of a wire having only a cross section defined by a semi-circle of radius R and a semi-ellipse. In FIG. 9 the orientation of the curve I is reversed like the curve G in FIG. 8. From FIG. 9 it will be seen that it is possible to obtain the same distance between the points 2 and 4 for the curve I as for the curve H.

It will therefore be realized that with the wire in accordance with the present invention, greater flattening at the point 2 is obtained than in the curve I. It will also be realised that the rumps 3 in the case of the wire of the invention are closer to the point 4 in the axial direction than are the rumps 30 on the curve 1. The amount of material is slightly augmented externally between the points 3 and 2. However, better stress distribution is obtained, the variation in curvatures being more attenuated.

It will be noted that the curve I is not conventional. In this connection, following the work of Fuchs carried out in 1959, as described in the journal Draht 42 (1991) 718, published on Aug. 1, 1991 according to data from the European Patent Office (but after the priority date of the present Application), the ratio between the distance separating the points 2 and 4 and the distance separating the points 30, i.e. the ratio between the lengths of the orthogonal major and minor axes, should be 1.22 as mentioned on page 499 of that document, with the circular portion directed outwardly.

With reference to the table given above, it will be seen that, in the spring of the invention, these values are departed from, the ratio being about 1.7 and the orientation of the cross section being reversed. The wire is therefore more flexible, while the stresses are very close to those found in a spring made of wire having a circular cross section.

What is claimed is:

1. A coil spring of wire having a cross section of generally ovoid profile having a wider end and a narrower end, and defining an axis of symmetry on which lies a point of the ovoid profile at its narrower end, directed outwardly of the spring, and an internal extremity at its wider end, the ovoid profile of the cross section further defining two convexities on either side of the axis of symmetry, the two convexities being defined by a succession of multi-arc curves comprising substantially continuous tangency and curvature and being joined to each other at a junction, wherein a vector tangential to said internal extremity defines an angle approximately in the range 0 to 7 degrees with respect to a line perpendicular to said axis of symmetry, said angle being in a direction opposite said narrower end.

2. A coil spring according to claim 1, wherein variations in curvature of the cross section are attenuated.

3. A coil spring according to claim 2, wherein said junction is closer to said internal extremity than said point, the latter being flattened.

4. A coil spring according to claim 3, wherein each of said convexities is defined by two cubic lines.

* * * * *